United States Patent
Fryman et al.

(10) Patent No.: US 8,601,242 B2
(45) Date of Patent: Dec. 3, 2013

(54) ADAPTIVE OPTIMIZED COMPARE-EXCHANGE OPERATION

(75) Inventors: Joshua B. Fryman, Corvallis, OR (US); Andrew Thomas Forsyth, Kirkland, WA (US); Edward Grochowski, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 853 days.

(21) Appl. No.: 12/653,800

(22) Filed: Dec. 18, 2009

(65) Prior Publication Data

US 2011/0154000 A1 Jun. 23, 2011

(51) Int. Cl.
*G06F 9/00* (2006.01)
(52) U.S. Cl.
USPC .......................................................... 712/220
(58) Field of Classification Search
None
See application file for complete search history.

(56) References Cited

U.S. PATENT DOCUMENTS

| | | | | |
|---|---|---|---|---|
| 5,889,983 A | * | 3/1999 | Mittal et al. | 712/223 |
| 6,128,706 A | * | 10/2000 | Bryg et al. | 711/141 |
| 6,671,792 B1 | * | 12/2003 | McAllister | 711/220 |
| 7,343,456 B2 | * | 3/2008 | Rowlands | 711/141 |
| 7,917,698 B2 | * | 3/2011 | Cypher et al. | 711/118 |

FOREIGN PATENT DOCUMENTS

| | | |
|---|---|---|
| JP | 06-222936 A | 8/1994 |
| JP | 2006-146920 A | 6/2006 |

OTHER PUBLICATIONS

Office Action Received for Japanese Patent Application No. 2010-249856, mailed on Sep. 25, 2012, 2 Pages of Japanese Office Action and 3 Pages of English Translation.

* cited by examiner

*Primary Examiner* — Andrew Caldwell
*Assistant Examiner* — Benjamin Geib
(74) *Attorney, Agent, or Firm* — Blakely, Sokoloff, Taylor & Zafman LLP

(57) ABSTRACT

A technique to perform a fast compare-exchange operation is disclosed. More specifically, a machine-readable medium, processor, and system are described that implement a fast compare-exchange operation as well as a cache line mark operation that enables the fast compare-exchange operation.

17 Claims, 3 Drawing Sheets

ADAPTIVE OPTIMIZED COMPARE-EXCHANGE OPERATION

FIELD OF THE INVENTION

This invention relates to the compare-exchange operation that is implemented in code executed by computing processors.

BACKGROUND OF THE INVENTION

The CMPXCHG (Compare-Exchange) operation is commonly used as one instruction in a sequence of instructions to form a critical section around a region of code (i.e., instructions, operations, etc.). It allows the region of code to execute atomically. A set of instructions may be considered atomic when two conditions are met: first, until the entire set of instructions completes, no other process can know about the changes being made, and second, if any of the instructions in the set fail then the entire set of instructions fails. When the entire set of instructions fails, the state of the computer system executing the instructions is restored to the state it was in before any of the instructions began. In some embodiments, the CMPXCHG instruction may be thought of as a software-defined wrapper of the region of code with the critical section. In other words, this wrapper can be designed into software code, but it is not a wrapper in the sense that it is enforced by hardware as such.

The CMPXCHG instruction assists sets of instructions to be executed atomically by checking to make sure a value retrieved from memory at the beginning of the atomic set has not been modified by another process during the execution of the set of instructions. For example, if a value in a specific location in memory is loaded into a register at the start of the atomic set of instructions, after the set of instructions has completed there may be a request to load a new (i.e., modified) value back into the original memory location (the modified value being the result of the set of instructions).

The CMPXCHG instruction can be utilized at the end of the atomic set of instructions to check to see if the value originally loaded from the particular memory location is still there in that location in memory (i.e., not modified by another process or thread at some point during the execution of the atomic set of instructions). If the original value is still there, then the CMPXCHG instruction loads the new value into the particular memory location that was storing the old value and the atomic set of instructions successfully completes. If the original value is not there, which means another process or thread did modify the value during the execution of the atomic set of instructions, then the CMPXCHG instruction does not load the new value into the particular memory location, notifies the system of this, and as a result of the notification, there may be a conditional jump implemented in the code to jump up to the beginning of the atomic set of instructions for another attempt at successful completion.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
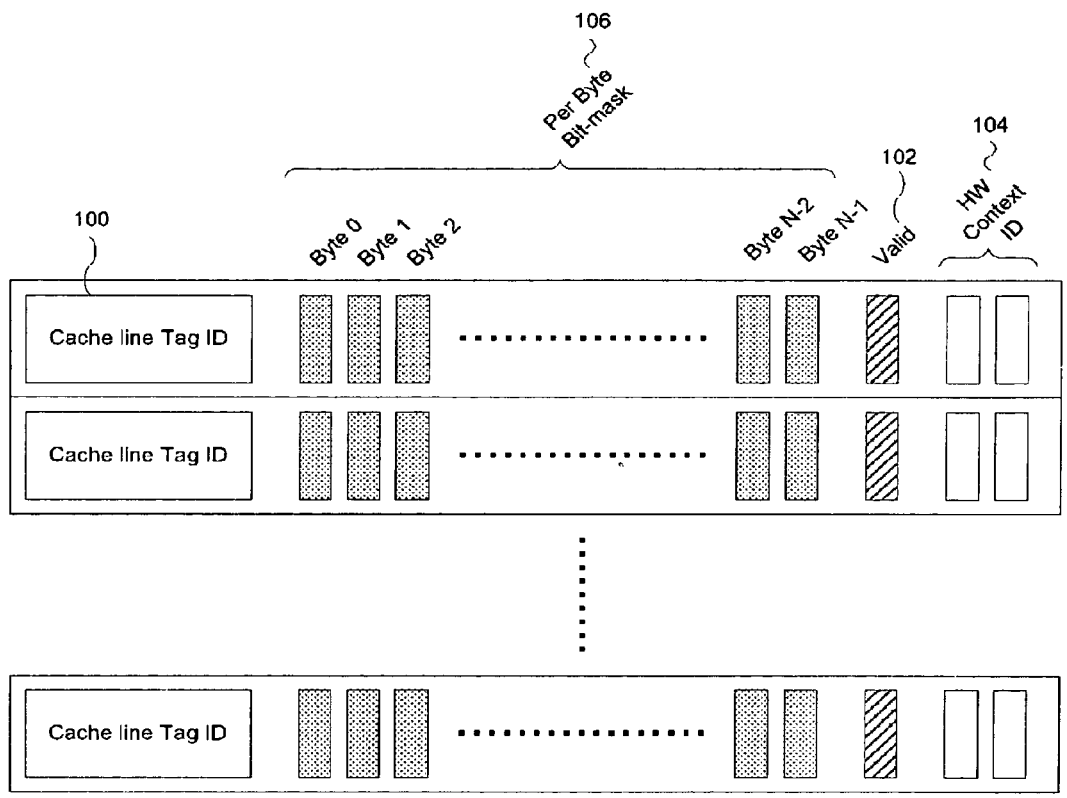
FIG. 1 illustrates an embodiment of a set of cache line tags utilized for the CLMARK command.

Embodiments of a machine readable medium, processor, and system to implement an adaptive optimized compare-exchange operation are described.

Two instructions are introduced: CLMARK (Cache Line Mark) and FASTCMPXCHG (Fast Compare-Exchange). The CLMARK instruction tags specific cache lines with microarchitectural hint bits in a tag identification structure. The hint bits, when inspected, are able to inform execution logic in a processor ready to execute a FASTCMPXCHG one of two methods. Specifically, either the data that was read from the cache to use in an atomic sequence of instructions has or has not been tampered with. If the data may have been tampered with (i.e., modified) during the sequence of atomic instructions, then the FASTCMPXCHG instruction falls back to a standard CMPXCHG (Compare-Exchange) instruction, which comprises a LOAD-COMPARE-STORE sequence of micro-operations. On the other hand, if, by inspecting the hint bits in the tag identification structure, the execution logic can determine that the data in that particular cache line has definitely not been modified, then a "fast" version of a CMPXCHG can be executed where the only micro-operation utilized is the final STORE. Thus, in many embodiments, the LOAD and COMPARE micro-operations can be dropped without requiring execution and this may speed up execution efficiency in a processor.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment. In the following description and claims, the terms "include" and "comprise," along with their derivatives, may be used, and are intended to be treated as synonyms for each other.

In today's multi-threaded environments, the thread executing the atomic set of instructions may be interrupted in the middle of the execution. Another thread may then be given control of memory and potentially change some or many stored values. This is just one example of why the value at the memory location being utilized by the atomic set of instructions may have been modified prior to the new value being given a chance to be re-written into the same memory location.

A use of an actual CMPXCHG instruction essentially includes the following basic format:

Lock CMPXCHG [mem], rdx

Specifically, the CMPXCHG execution flow causes the following to take place:

1) The value stored at [mem] (the memory location pointed to by mem address) is loaded (LOAD instruction) into a first register (the "first" register comprises the specific register utilized by the execution logic for the embedded LOAD micro-operation within CMPXCHG).

2) The value in the first register is compared (COMPARE micro-operation) against the eax/rax register (eax or rax depending on the size of the operand).

3) If the comparison shows that the two values are equal (i.e., the value in memory has not changed), then the value in the rdx register is written (STORE micro-operation) into [mem].

4) If the comparison shows that the two values are different (i.e., the value in memory has changed), then the current value stored in [mem] is loaded into eax/rax.

The lock prefix causes the CMPXCHG instruction itself to turn into an atomic instruction. This is recommended since the CMPXCHG instruction is broken out into the LOAD-COMPARE-STORE combination of micro-operations described above.

The entire CMPXCHG instruction either succeeds or fails based on the result of the COMPARE instruction in step 2 above. A simple method to check for success for CMPXCHG is that if it works the zero flag (ZF) is set, if not the ZF is cleared. The set of micro-operations (LOAD-COMPARE-STORE) is prefaced at some point prior to the CMPXCHG instruction itself with an additional LOAD instruction because at the start of the atomic set of instructions the CMPXCHG instruction needs an initial LOAD of the value at [mem] into the eax/rax register. An example of the entire atomic set of instructions may look like the following code:

```
try_again:
mov rax,        ; loads value in memory at location [mem] into rax
[mem]
mov rdx, rax    ; loads value in rax into rdx
** insert code to manipulate rdx into (potentially) new value **
lock cmpxchg    ; if value in rax still equals value in memory at location
[mem], rdx      ; [mem], then load rdx into memory at location [mem]
jnz try_again   ; if the cmpxchg succeeds, ZF = 1, otherwise ZF = 0,
                ; so a jump if not zero instruction would cause another
                ; try
```

When the CMPXCHG instruction is utilized, the LOAD-COMPARE-STORE combination of micro-operations utilized is a serially dependent flow. The number of micro operations required to complete the CMPXCHG instruction can be significant because of the serial flow dependencies.

As previously stated, the CMPXCHG instruction is commonly used as one instruction in a sequence of instructions to form a critical section around a region of code and is specifically used to determine whether another process/thread has made a modification to the value at the specific memory location in question. If no other process/thread within the core in question interrupted the code flow of the atomic set of instructions and if no other core running different code has snooped the cache line in question, then there would be no change to the value at the memory location. Thus, if it could be previously known that, without even looking at the value at the memory location, no other process/thread within the same core or within another core has modified the contents of the memory at the memory location, then it generally would not be required to perform the LOAD and COMPARE portions of the CMPXCHG instruction. Rather, if through other means, it could be determined that there was no external (i.e. other process/thread/core) influence to the value at the memory location, the only needed portion of the CMPXCHG instruction would be the final STORE micro-operation of the new value back to the memory location.

Therefore, in many embodiments two new instructions may be implemented to render the COMPARE-STORE portion of the standard CMPXCHG combination of micro-operations generally unnecessary to execute. In other words, in the majority of cases, the new instructions would allow simply the STORE portion of the combination to execute.

In many embodiments, the two instructions may be referred to as a CLMARK instruction and a FASTCMPX-CHG instruction. The first new instruction is CLMARK. The CLMARK instruction may have the following specific format:

CLMARK8B mem

The mem field contains a base memory address that falls within one cacheline. The 8B field indicates how many bytes, starting at the mem address to consider for the FASTCMPX-CHG instruction. In many embodiments, there may be versions of the CLMARK instruction that have the 8B field supporting byte sizes of all powers of two up to the cache line size of the CPU (Central Processing Unit).

The CLMARK operation sets a required uniquely identifying tag on the target cache line that the mem location refers to, indicating intended ownership for an atomic sequence. For example, a "valid" bit may be utilized in the uniquely identifying tag to show that the data in the cache line for that particular mem location is still valid. Additionally, the uniquely identifying tag may also include a hardware context ID if the CPU supports multiple hardware contexts per core. Another additional possibility in the uniquely identifying tag may include a bit-mask for each cache line (or potentially in a dedicated small table stored within the CPU). The bit-mask may utilize a single bit for each byte in the cache line. This bit-mask may be utilized to minimize false sharing conflicts in shared data structures.

If the CPU does not support the CLMARK instruction, execution logic in the core may just replace each CLMARK with a "no operation" (NOP) instruction. This CLMARK 4 NOP substitution is the reason why the CLMARK tag bits are considered hint bits. Additionally, a system implementing the CLMARK/FASTCMPXCHG instructions may also do the CLMARK 4 NOP substitution at any time. There may be many examples of why a system capable of utilizing CLMARK/FASTCMPXCHG decides to utilize CMPXCHG instead. E.g., an internal shared resource has been exhausted, a specific event has taken place, and a debug/test register has been set, among many other reasons.

FIG. 1 illustrates an embodiment of a set of cache line tags utilized for the CLMARK command.

As stated, each tag may include one or more of the following structural components: a cache line tag ID 100, a valid bit 102, a HW context ID 104, and a bit-mask 106. All of the tag information illustrated in FIG. 1 may be referred to as a whole as a tag identification structure. In many embodiments, the bit-mask masks the cache line on a per-byte basis, where each byte has its own bit for the mask. Thus, if there are N bytes in the cache line, there are bits in the bit mask for Bytes 0 through N−1. When a CLMARK instruction is executed, the mem base address and 8B size fields are utilized to set appropriate bit-mask values, which flag those bytes in the cache line involved in an upcoming FASTCMPXCHG sequence.

In alternative embodiments, the per-byte bit-mask field may not be utilized. When the per-byte bit-mask field is not utilized, a single bit may be used for the entire cache line to indicate the cache line was involved in the CLMARK/FASTCMPXCHG instructions.

The FASTCMPXCHG is the second new instruction. The FASTCMPXCHG instruction may have the following specific format:

lock FASTCMPXCHG8B [mem], testval, newval

The FASTCMPXCHG instruction is presented differently from the original CMPXCHG instruction to avoid legacy code issues. In other words, legacy code utilizing CMPX-CHG may not include the correct format or contingencies if the CMPXCHG instruction was updated to operate like the FASTCMPXCHG instruction, thus two separate instructions are utilized. The legacy and new instructions may or may not share execution units. Though, it may be efficient to share execution units among the legacy and new instructions given the amount of functional replication between the two instructions.

The FASTCMPXCHG [mem] field points to the base memory address of the location in memory, which corresponds to the cacheline storing the value to be utilized for compare and exchange purposes. The 8B field, mirroring the CLMARK 8B field purpose above, indicates how many bytes, starting at the [mem] address to consider for the FASTCMPXCHG instruction. In many embodiments, there may be versions of the FASTCMPXCHG instruction that have the 8B field supporting byte sizes of all powers of two up to the cache line size of the CPU.

The FASTCMPXCHG instruction is broken down into the separate LOAD-COMPARE-STORE μops (micro-operations) phases, as detailed above, but there is a branch that can be taken prior to the LOAD. The internal branch determines whether or not the full LOAD-COMPARE-STORE μop sequence is executed in order, or whether the LOAD-COMPARE portion is skipped, and only the STORE is actually executed. The branch within the FASTCMPXCHG instruction determines which path to take based on a number of decisions. Thus, the FASTCMPXCHG operation may adapt to function in either case on the hardware executing the code.

Figure 2:
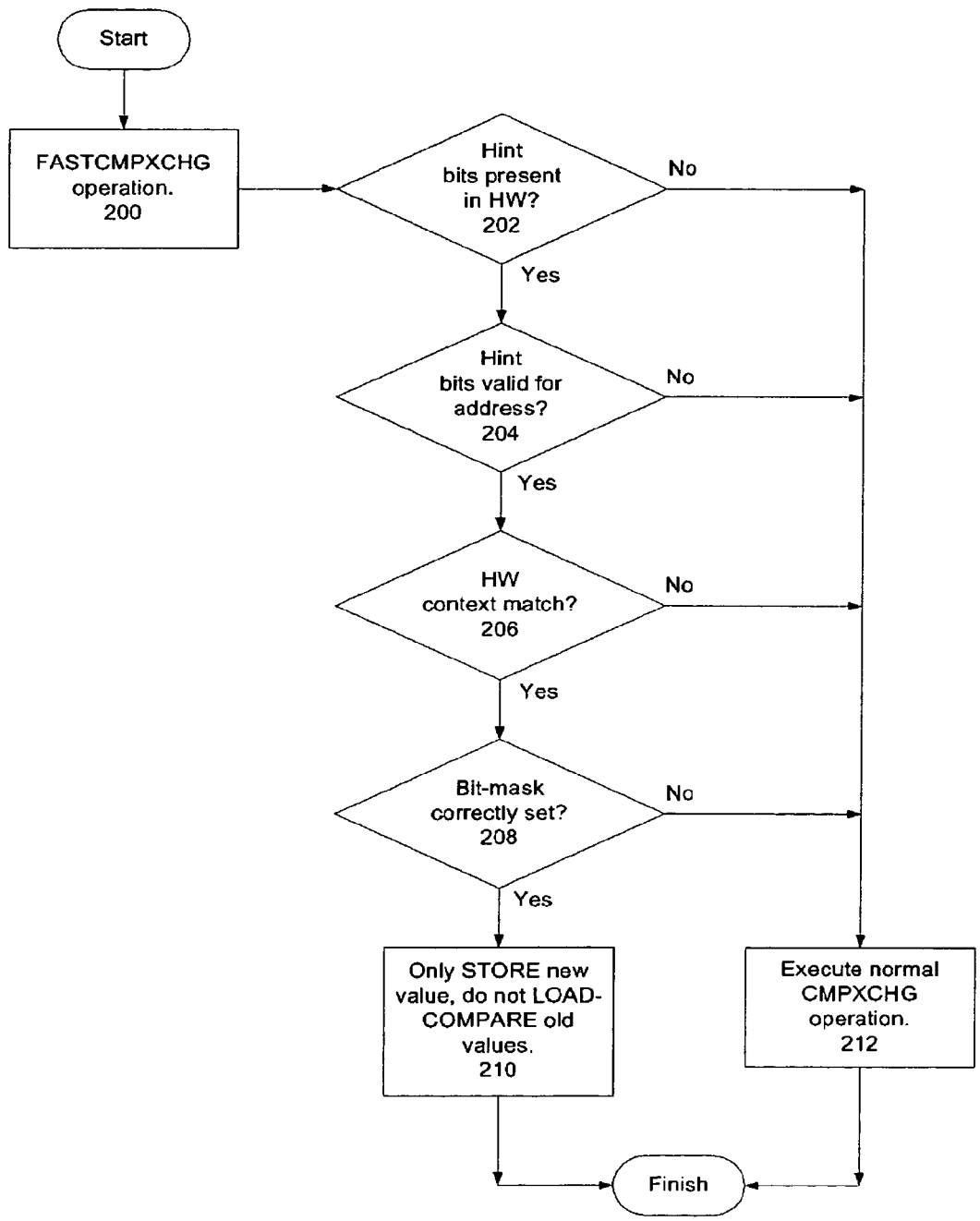
FIG. 2 is a flow diagram illustrating an embodiment of the FASTCMPXCHG instruction decision tree as to whether to execute the full CMPXCHG micro-operation sequence or only the STORE portion of the CMPXCHG operation.

FIG. 2 is a flow diagram illustrating an embodiment of the FASTCMPXCHG instruction decision tree as to whether to execute the full CMPXCHG μop sequence or only the STORE portion of the CMPXCHG operation.

The processing logic determining which direction to proceed within the decision tree may comprise hardware (e.g., execution unit circuitry), firmware (e.g., general CPU microcode), or a combination of both hardware and firmware. Turning to FIG. 2, processing logic begins by receiving a FASTCMPXCHG operation in the execution pipeline (processing block 200). The processing logic then looks for the cache line tag that includes the microarchitectural hint bits associated with the FASTCMPXCHG instruction (processing block 202). The tag that a preceding CLMARK could utilize would be present for each cache line if the hardware is capable of processing a FASTCMPXCHG. If the hardware does not have the tags, then CLMARK and FASTCMPXCHG are not supported. Therefore, processing logic would then just utilize the [mem], testval, and newval parameters to execute a standard CMPXCHG instruction in place of the listed FASTCMPXCHG instruction in the code (processing block 212).

Otherwise, if the tags containing the microarchitectural hint bits are present, then processing logic checks to see if the hint bits are valid for the [mem] address (processing block 204). Processing logic can determine if the bits are valid by checking the "valid" bit (as described in FIG. 1) for the cache line tag matching the [mem] address. The CLMARK instruction can set the bit to "valid." If the "valid" bit is not set, the data in that cache line is not valid data for the FASTCMPXCHG instruction and processing logic then executes a normal CMPXCHG instruction using the [mem], testval, and newval parameters (processing block 212). If the "valid" bit is set signifying that the data in the cache line at the [mem] address is valid and processing logic will then determine if the current hardware context is a match against the hardware context ID'd in the microarchitectural hint bits in the cache line tag (i.e., hint bits 104 in FIG. 1) (processing block 206). If the hardware does not support multiple hardware contexts then the HW context ID 104 hint bits will always be the same and this portion of the process will always succeed. If multiple hardware contexts are supported, then the HW context ID 104 would need to match for this portion of the process to succeed.

If the HW context ID does not match, then processing logic executes a normal CMPXCHG instruction using the [mem], testval, and newval parameters (processing block 212). On the other hand, if the HW context ID does match or the HW does not support multiple contexts, then processing logic determines if the bit-mask is set correctly (processing block 208). Processing logic would compare the CLMARK bit-mask against the FASTCMPXCHG bit-mask. If these bit-masks do not match, then processing logic executes a normal CMPXCHG instruction using the [mem], testval, and newval parameters (processing block 212). Otherwise, if the bit-masks match, then processing logic can then go ahead and execute the new FASTCMPXCHG instruction, which causes the new value to be directly stored (STORE) without a LOAD-COMPARE portion of the CMPXCHG instruction executed (processing block 210).

As described, if any fork in the decision tree in FIG. 2 fails, then the normal CMPXCHG is always executed as the fallback case. This ensures forward progress of the code.

The microarchitectural hint bits (described in detail in FIG. 1) may be cleared and set invalid for a given cache line on any one of the following conditions:
1) A FASTCMPXCHG instruction is successfully executed on the cache line.
2) The cache line with the hint bits is evicted from the cache.
3) A CLMARK executed by another hardware context targeted the cache line.
4) The cache line is written to by any hardware context.
5) An interrupt occurs.
6) Any hardware failure occurs between the time the CLMARK occurs and prior to the successful completion of the FASTCMPXCHG instruction.

In other embodiments, the microarchitectural hint bits may not be cleared upon a successful execution of the FASTCMPXCHG instruction. It may be more efficient to not clear the hint bits in this case so that successive FASTCMPXCHG operations can take place without the overhead associated with CLMARK instructions, as long as the instructions operate on the same data, In many embodiments where bit-mask fields are utilized, the rules for clearing and invalidating the cache line hint bits in the above list may be modified accordingly to account for cache situations that, although the cache line may be affected, none of the bytes flagged by the CLMARK are specifically affected.

Furthermore, the lock prefix may also be utilized for the FASTCMPXCHG instruction to turn it into an atomic instruction. This is recommended since if the FASTCMPXCHG instruction does not succeed by eliminating the LOAD-COMPARE portion of the CMPXCHG instruction, then the full LOAD-COMPARE-STORE combination of μops is executed and, therefore, the lock is needed just as it is needed for the original CMPXCHG instruction.

The following describes an embodiment of a CPU executing the CLMARK-FASTCMPXCHG instructions. In this embodiment, the CPU includes one or more cores capable of tagging the cache with the requisite microarchitectural hint bits. The entire amount of sample code is listed below:

```
try_again:
clmark [mem]    ; sets up the hint bits for the cache line at [mem]
mov rax, [mem]  ; loads value in memory at location [mem] into rax
mov rdx, rax    ; loads value in rax into rdx
inc rdx         ; rdx is modified
```

```
lock fastcmpxchg    ; if FIG. 2 processing blocks 202, 204, 206,
[mem], rdx          and 208 are all
                    ; true regarding hint bits for the cache line at [mem],
                    ; then rdx is stored into memory at [mem], otherwise
                    ; standard cmpxchg is performed
jnz try_again       ; if the fastcmpxchg succeeds, ZF = 1, otherwise
                    ; ZF = 0, so a jump if not zero instruction would cause
                    another try
```

Figure 3:
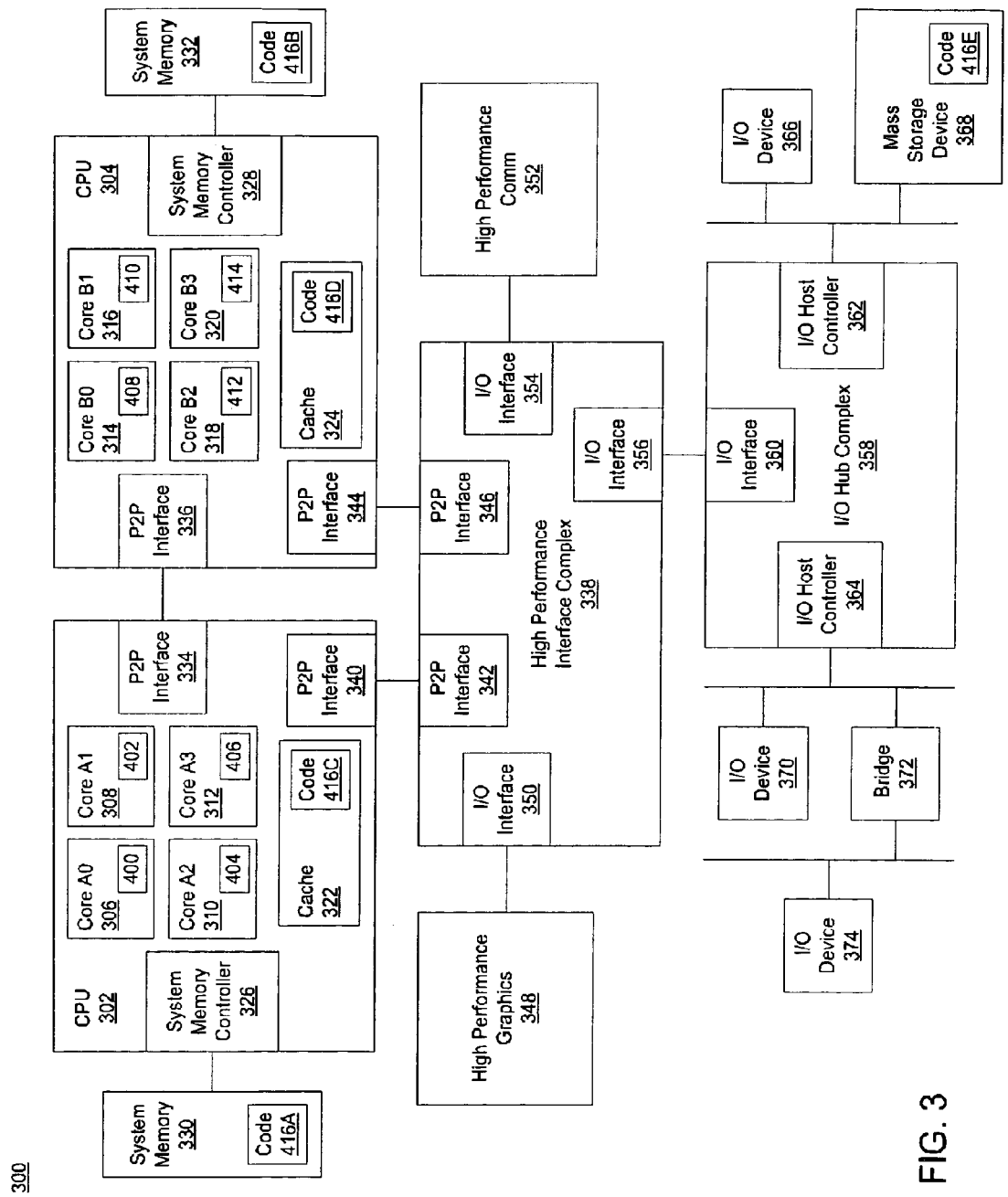
FIG. 3 illustrates an embodiment of a computer system that includes one or more CPU cores capable of performing CLMARK and FASTCMPXCHG instructions.

FIG. 3 illustrates an embodiment of a computer system that includes one or more CPU cores capable of performing CLMARK and FASTCMPXCHG instructions.

Computer system 300 is shown. The computer system may be a desktop, server, workstation, laptop, handheld, television set-top, media center, game console, integrated system (such as in a car), or other type of computer system. In several embodiments the computer system 300 includes one or more central processing units (CPUs). Although in many embodiments there are potentially many CPUs, in the embodiment shown in FIG. 3 only two CPUs (302 and 304) are shown for clarity. CPUs 302 and 304 may be Intel® Corporation CPUs or CPUs of another brand. Each CPU includes one or more cores. In the embodiment shown, CPU 302 includes Core A0 (306), Core A1 (308), Core A2 (310), and Core A3 (312) and CPU 304 includes Core B0 (314), Core B1 (316), Core B2 (318), and Core B3 (320).

In other embodiments, CPUs 302 and 304 may each have a number of cores either greater than or less than the four cores each are shown to have in FIG. 3. In many embodiments, each core (such as core A0 (306)) includes internal functional blocks such as one or more execution units, retirement units, a set of general purpose and specific registers, etc. If the cores shown in FIG. 3 are multi-threaded or hyper-threaded, then each hardware thread may be considered as a core as well.

CPUs 302 and 304 each may also include one or more caches, such as last level caches (LECs) 322 and 324, respectively. In many embodiments that are not shown, additional caches other than caches 322 and 324 are implemented where multiple levels of cache exist between the execution units in each core and memory. In different embodiments the caches may be apportioned in different ways. Each of caches 322 and 324 may be one of many different sizes in different embodiments. For example, caches 322 and 324 each may be an 8 megabyte (MB) cache, a 16 MB cache, etc. Additionally, in different embodiments the cache may be a direct mapped cache, a fully associative cache, a multi-way set-associative cache, or a cache with another type of mapping. Each cache may include one large portion shared among all cores in the respective CPU or may be divided into several separately functional slices (e.g., one slice for each core). Each cache may also include one portion shared among all cores and several other portions that are separate functional slices per core.

In many embodiments, CPUs 302 and 304 each include their own system memory controller (326 and 328, respectively) to provide an interface to communicate with system memories 330 and 332. In other embodiments that are not shown, memory controllers 330 and 332 may be discrete devices or integrated within other devices in computer system 300.

System memory 330 and 332 may comprise dynamic random access memory (DRAM), such as a type of double data rate (DDR) DRAM, non-volatile memory such as flash memory, phase change memory (PCM), or another type of memory technology. System memories 330 and 332 may be general purpose memories to store data and instructions to be operated upon by CPUs 302 and 304, respectively. Additionally, there may be other potential devices within computer system 300 that have the capability to read and write to the system memories, such as a direct memory access (DMA)-capable I/O (input/output) device.

The link (i.e., bus, interconnect, etc.) that couples each CPU with each respective system memory may include one or more optical, metal, or other wires (i.e. lines) that are capable of transporting data, address, control, and clock information.

Furthermore, CPUs 302 and 304 may communicate with each other through a point-to-point (P2P) interface using P2P interface circuits 334 and 336, respectively. The P2P interface may include high-speed bi-directional serial links, separated pairs of uni-directional serial links, or links implemented in parallel, among others. Apart from communicating with each other, CPUs 302 and 304 may also communicate through the same type of P2P interface with a high performance interface complex 338. Specifically, CPU 302 may communicate with complex 338 through P2P interface circuitry 340 on the CPU side and P2P interface circuitry 342 on the complex 338 side and CPU 304 may communicate with complex 338 through P2P interface circuitry 344 on the CPU side and P2P interface circuitry 346 on the complex 338 side.

High performance interface complex 338 may provide an interface to any subsystems that require high data throughput. For example, high performance graphics subsystem 348 may communicate with the CPUs through I/O interface 350 and high performance communications subsystem 352 may communicate through I/O interface 354. High performance interface complex 338 may also include I/O interface 356 to communicate to an I/O hub complex 358, which utilizes I/O interface 360. The circuitry for each I/O interface shown in computer system 300 may be the same or may be different. For example, the I/O interface 350 coupling the high performance graphics subsystem 348 to the complex 338 may comprise a 16-lane Peripheral Component Interface (PCI)-Express protocol link, whereas the I/O interface 356 coupling the high performance interface complex 338 to the I/O complex 358 may utilize a different protocol.

The I/O hub complex 358 may provide a general communication interface between devices coupled to one or more I/O interconnects (i.e. busses) and the CPUs 302 and 304. For example, I/O hub complex 358 may include host controllers 362 and 364. Each host controller may provide an interface to allow I/O devices to be communicatively coupled to the rest of the computer system 300. For example, one I/O hub complex may be a Universal Serial Bus (USB) hub complex and another might be a legacy PCI hub complex. I/O devices 366 and 370 are shown coupled to I/O host controllers 362 and 364, respectively. In many embodiments, there may be a mass storage device 368 coupled to an I/O host controller, such as I/O host controller 362. The mass storage device 368 may be a hard disk drive, a solid state drive, a phase change memory array, or another form of mass storage. Additionally, one or more bridge interfaces to other legacy busses may be present. For example, bridge 372 may be coupled to the I/O host controller interface and this bridge may provide protocol translation to another protocol interconnect/bus upon which I/O device 374 is coupled.

At least one embodiment of the processing logic capable of successfully executing the CLMARK and FASTCMPXCHG instructions may be present in each core in computer system 300. This logic is represented by processing logic 400, 402, 404, and 406 in cores A0 (306), A1 (308), A2 (310), and A3 (312), respectively, as well as by processing logic 408, 410, 412, and 414 in cores B0 (314), B1 (316), B2 (318), and B3 (320), respectively. Furthermore, in other embodiments, the processing logic capable of successfully executing the CLMARK and FASTCMPXCHG instructions may be distributed throughout several circuits, logic units, or devices illustrated in FIG. 3.

Although not illustrated, other computer system implementations utilizing different layouts of CPUs, busses, memory, etc. are perfectly acceptable to implement the invention as well.

Additionally, the code including the CLMARK and FASTCMPXCHG instructions may reside in one or more locations in the computer system 300 at different times during operation. For example, the code 416 implementing the new instructions may reside (i.e., be stored in) system memory 330 or 332 (code 416A or 416B), within cache 322 or 324 (code 416C or 416D), within mass storage device 368 (code 416E), or elsewhere within or external to the computer system 300.

Thus, embodiments of a machine readable medium, processor, and system to implement an adaptive optimized compare-exchange operation are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A non-transitory machine-readable medium having stored thereon a method, which when executed by a machine causes the machine to perform the method comprising:
    receiving a fast compare-exchange operation that includes a memory address, test value, and a data value;
    determining if the received fast compare-exchange instruction is to execute in a fast mode or in a normal mode;
    in normal mode, executing a compare-exchange operation comprising,
        loading a value stored at the memory address,
        comparing the loaded value against the test value,
        loading the value stored at the memory location into the test value when the loaded value and test value are not equal; and
    in fast mode, storing the data value into memory at the memory address when the loaded value and test value are equal.

2. The machine-readable medium of claim 1, wherein the method further comprises:
    performing a cache line mark operation prior to performing the fast compare-exchange operation.

3. The machine-readable medium of claim 2, wherein the cache line mark operation includes a memory address location parameter.

4. The machine-readable medium of claim 3, wherein the cache line mark operation further comprises:
    setting a valid bit in a tag identification structure of a cache line storing data retrieved from a memory at the memory address location.

5. The machine-readable medium of claim 4, wherein the cache line mark operation further comprises:
    setting a bit-mask in the tag identification structure, the bit-mask indicating which bits of the cache line are relevant to the cache line mark operation.

6. The machine-readable medium of claim 5, wherein the cache line mark operation further comprises:
    setting a hardware context identification value in the tag identification structure, the hardware context identification value indicating a particular hardware context performed the cache line mark operation.

7. The machine-readable medium of claim 6, wherein determining if the received fast compare-exchange instruction is to execute in a fast mode or in a normal mode further comprises:
    confirming the valid bit is set;
    confirming the bit-mask is correctly set between the cache line mark bit-mask and a fast compare-exchange bit mask; and
    confirming the cache line mark hardware identification context matches a fast compare-exchange hardware identification context.

8. The machine-readable medium of claim 2, wherein the performed method further comprises:
    substituting a no operation instruction for the cache line mark instruction in response to confirming that the machine does not support the cache line mark instruction.

9. The machine-readable medium of claim 4, wherein the performed method further comprises:
    clearing the valid bit when an occurrence of one of a fast compare-exchange operation successfully executes, the cache line is evicted, a cache line mark operation from another hardware context is performed upon the cache line, the cache line is written to by any hardware context, an interrupt occurs, and any hardware failure occurs during the cache line mark sequence, takes place.

10. A processor comprising:
    decode logic to decode a fast compare-exchange instruction that includes a memory address, test value, and a data value; and
    execution logic to
        determine if a decoded fast compare-exchange instruction is to execute in a fast mode or in a normal mode;
        in normal mode, to execute a compare-exchange operation comprising,
            loading a value stored at the memory address,
            comparing the loaded value against the test value,
            loading the value stored at the memory location into the test value when the loaded value and test value are not equal; and
        in fast mode, to store the data value into memory at the memory address when the loaded value and test value are equal.

11. The processor of claim 10, further comprising:
    decode logic to decode a cache line mark instruction; and
    execution logic to execute the cache line mark instruction after it has been decoded.

12. The processor of claim 11, wherein the processor includes a register to store a memory address location.

13. The processor of claim 12, wherein the execution logic is further operable to:
    set a valid bit in a tag identification structure of a cache line storing data retrieved from a memory at the memory address location.

14. The processor of claim 13, wherein the execution logic is further operable to:
    set a bit-mask in the tag identification structure, the bit-mask indicating which bits of the cache line are relevant to the cache line mark operation.

15. The processor of claim 14, wherein the execution logic is further operable to:
    set a hardware context identification value in the tag identification structure, the hardware context identification value indicating a particular hardware context performed the cache line mark operation.

16. The processor of claim 15, wherein the execution logic is further operable to:
- determine whether the valid bit is set;
- determine whether the bit-mask is correctly set between the cache line mark bit-mask and a fast compare-exchange bit mask; and
- determine whether the cache line mark hardware identification context matches a fast compare-exchange hardware identification context.

17. The processor of claim 11, wherein the execution logic is further operable to:
- substitute a no operation instruction for the cache line mark instruction in response to confirming the processor does not support the cache line mark instruction.

* * * * *